April 13, 1926.
H. B. LAYMAN ET AL
1,580,910
CHAIN AND METHOD OF MAKING THE SAME
Filed Nov. 28, 1923    4 Sheets-Sheet 1
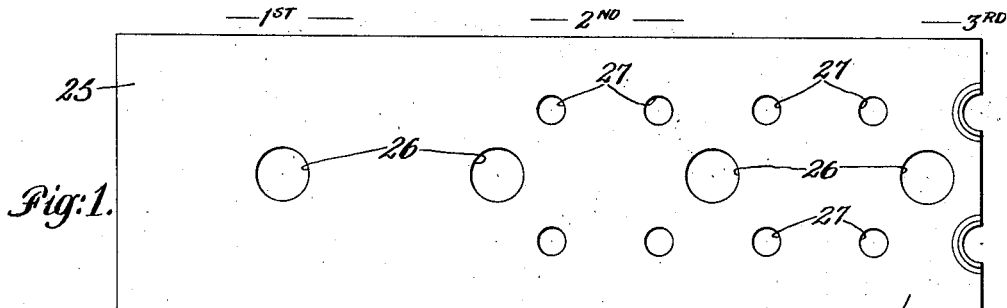
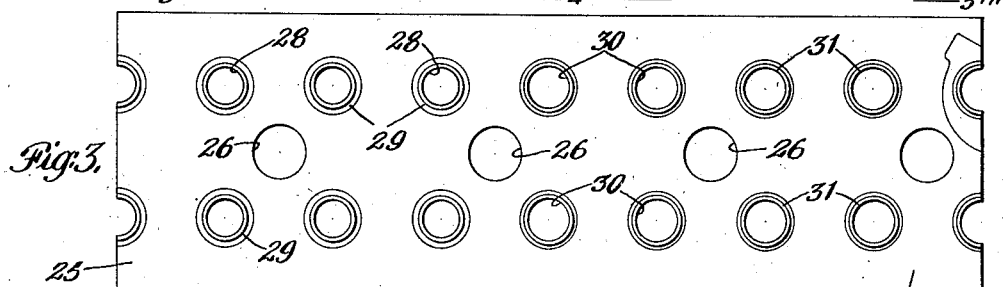
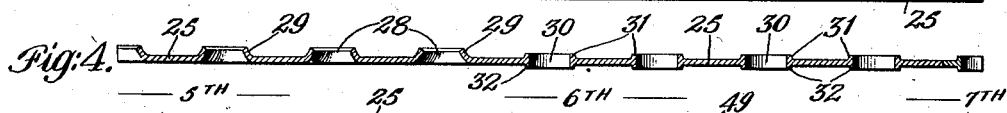
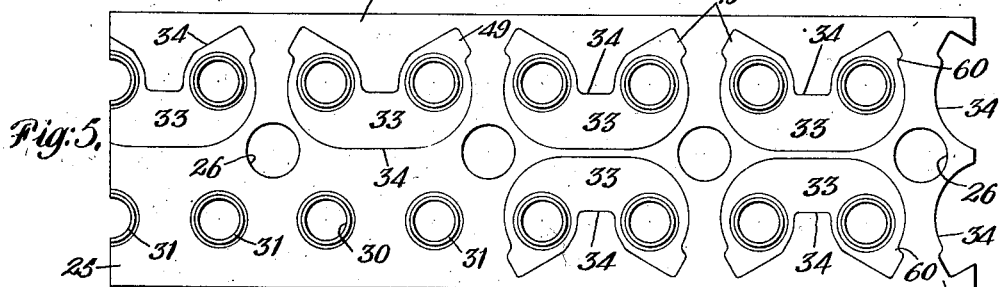
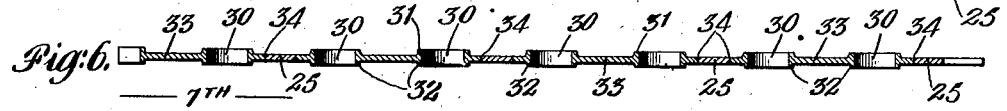
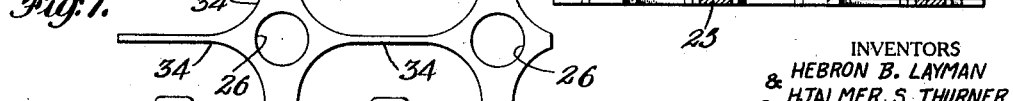
INVENTORS
HEBRON B. LAYMAN
& HJALMER S. THURNER
BY
Edwards, Sager & Bower
ATTORNEYS April 13, 1926.                          1,580,910
H. B. LAYMAN ET AL
CHAIN AND METHOD OF MAKING THE SAME
Filed Nov. 28, 1923          4 Sheets-Sheet 2
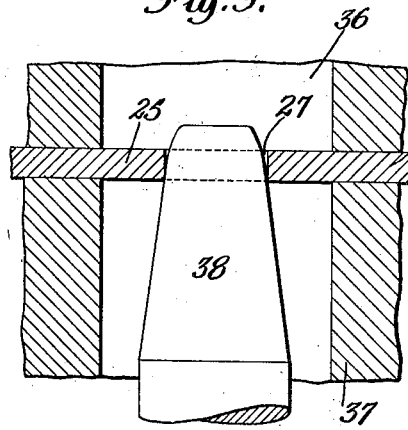
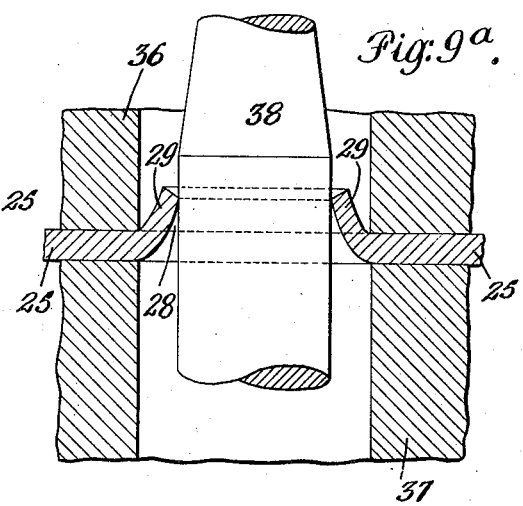
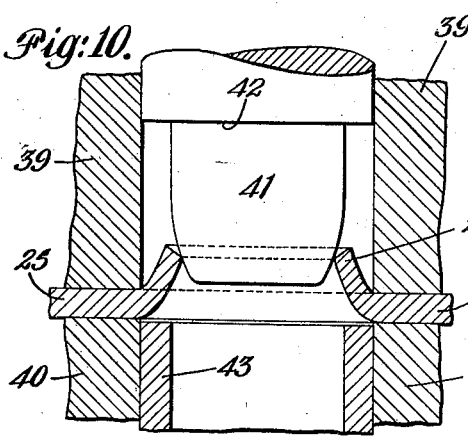
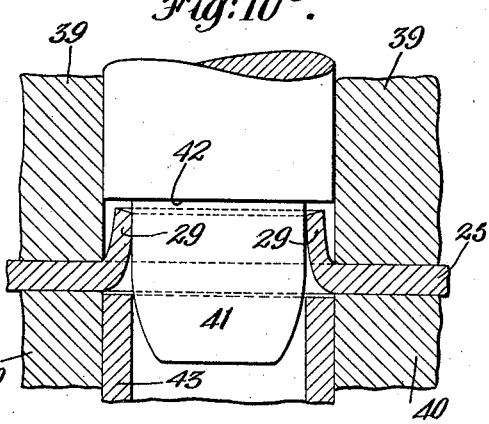
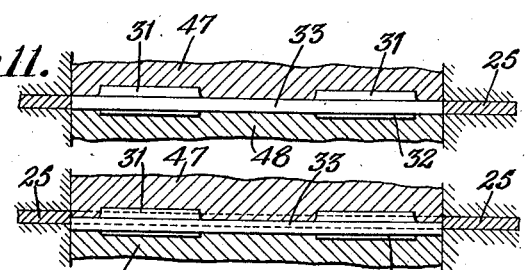
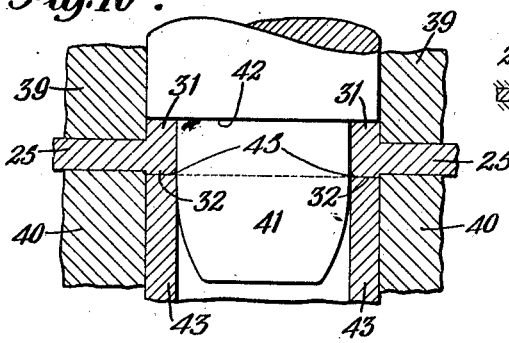
INVENTORS
HEBRON B. LAYMAN
& HJALMER S. THURNER
BY
Edward Sager Power
ATTORNEYS

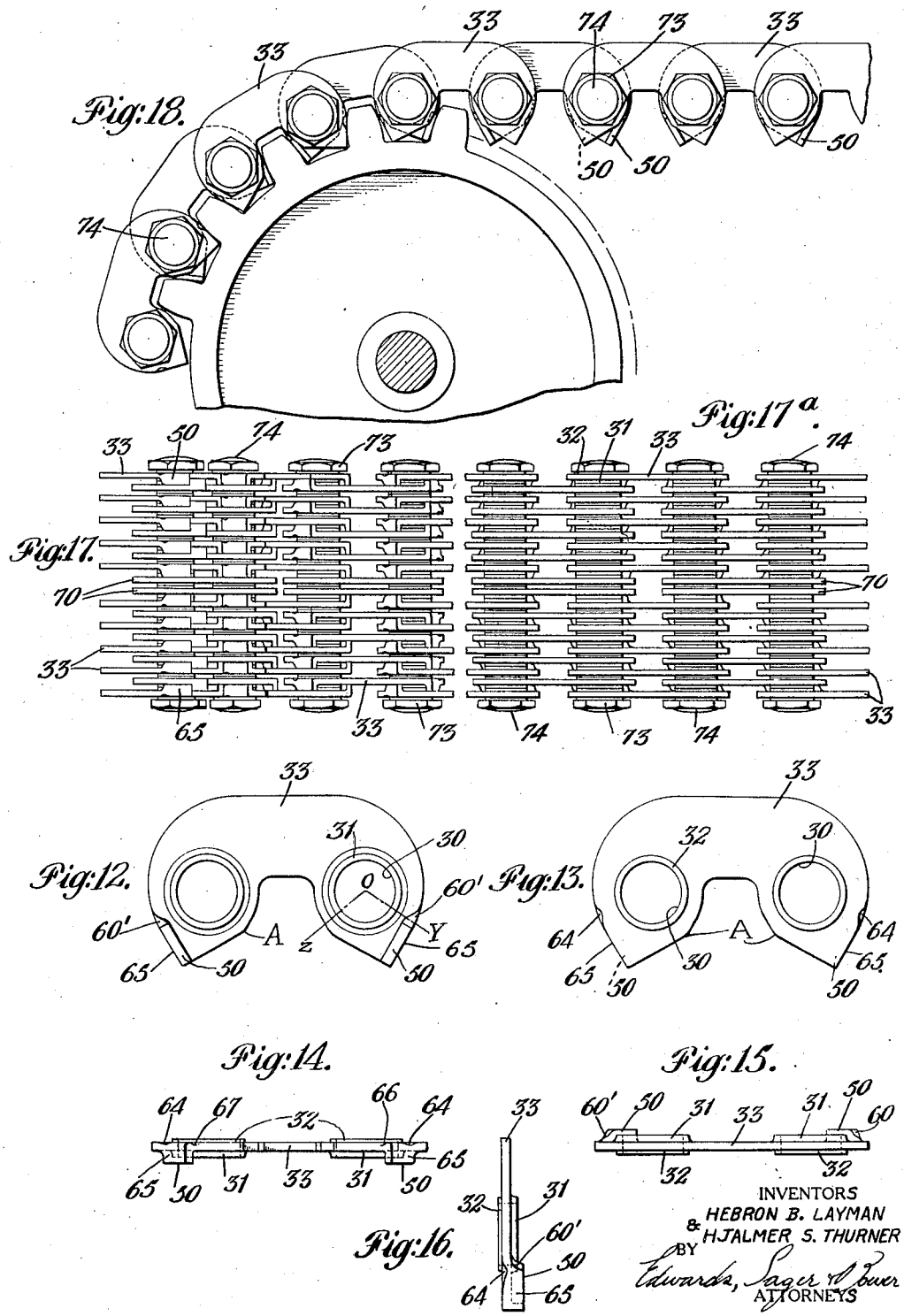

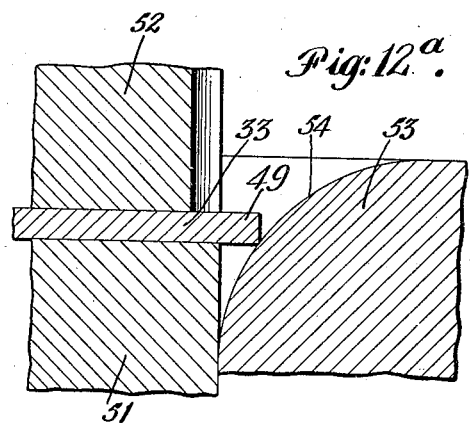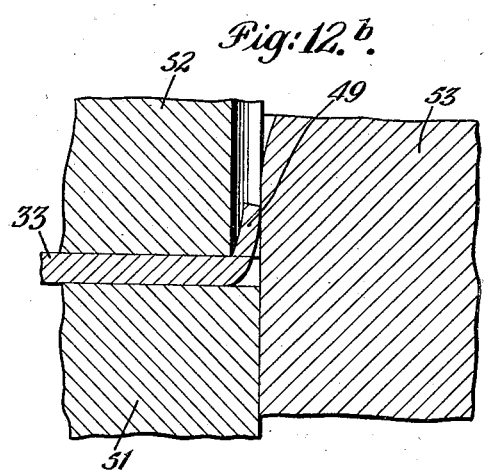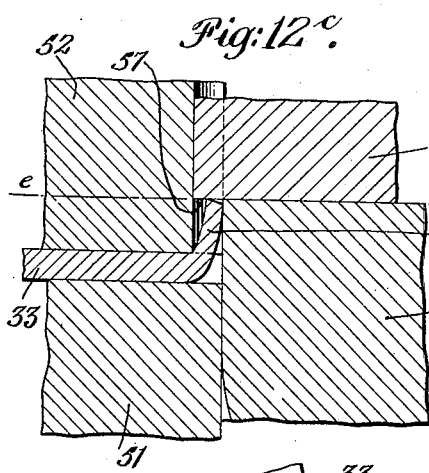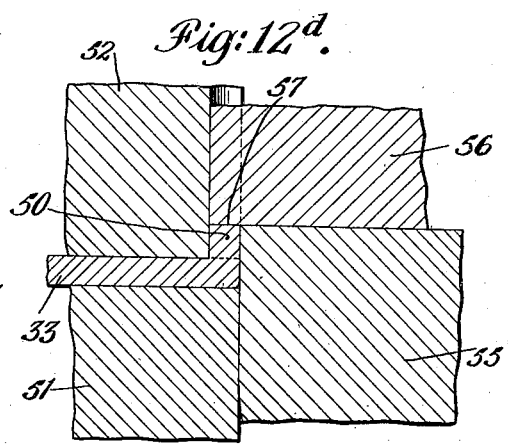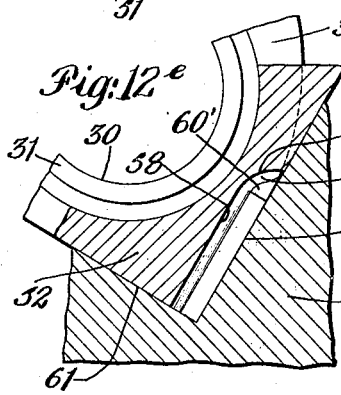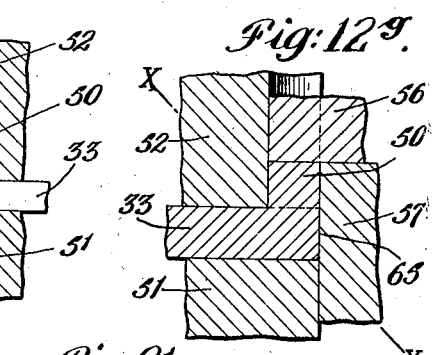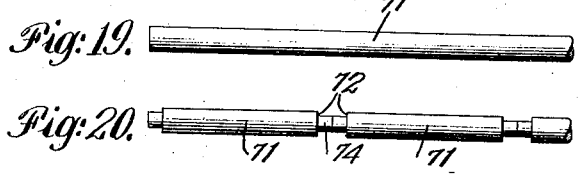

Patented Apr. 13, 1926.

1,580,910

UNITED STATES PATENT OFFICE.

HEBRON B. LAYMAN AND HJALMER S. THURNER, OF NEW YORK, N. Y., ASSIGNORS TO C & C SALES CORPORATION, A CORPORATION OF NEW YORK.

CHAIN AND METHOD OF MAKING THE SAME.

Application filed November 28, 1923. Serial No. 677,365.

*To all whom it may concern:*

Be it known that we, HEBRON B. LAYMAN and HJALMER S. THURNER, citizens of the United States, residing at New York, in the county of New York and State of New York, have invented certain new and useful Improvements in Chains and Methods of Making the Same, of which the following is a specification.

This invention relates to a link chain and a process of producing the same. The object of the invention is to provide a chain of the angular tooth type which will be strong, light and durable and inexpensive to manufacture.

Another object of the invention is to provide a chain in which the link teeth are so formed and spaced that the chain will be usable with chain gears now generally in use so that it may be substituted for or replace the present chains without changing the gears.

Further objects of the invention particularly in the formation of the chain links of pressed sheet metal will appear from the following specification taken in connection with the accompanying drawings in which, Figs. 1, 3, 5 and 7 are plan views of a strip of material illustrating one form of link for the chain of this invention.

Figs. 2, 4, 6 and 8 are sectional views of the same.

Figs. 9, 9ª, 10, 10ª and 10ᵇ, 11 and 11ª are diagrammatic sectional views illustrating the steps of the process of forming the chain links as shown in Figs. 1 to 8.

Figs. 12 and 13 are side views of a completed link.

Figs. 12ª, 12ᵇ, 12ᶜ, 12ᵈ, 12ᵉ, 12ᶠ and 12ᵍ are diagrammatic sectional views illustrating the final steps in the formation of the link.

Fig. 14 is an edge view of a link as seen from below in Fig. 12.

Fig. 15 is an edge view of a link as seen from above in Fig. 13.

Fig. 16 is an end view of a link as seen from the left in Fig. 12.

Fig. 17 is a view of a section of a chain illustrating the invention taken from the toothed side.

Fig. 17ª is a plan view of a section of a chain illustrating the invention.

Fig. 18 is a side view of a chain section partly in place on a gear wheel, and

Figs. 19, 20 and 21 are diagrammatic illustrations of the process of forming the pins for the chain.

The invention is particularly illustrated in connection with the production of chain having approximately one half inch pitch between pin centers, such as would be used for instance in connection with counter shaft or timing gear drives of automobile engines and the like. It is understood, however, that the invention is not limited to the specific matter illustrated and described but is adapted for various other types and sizes of chain.

In the specific embodiment of the invention shown in the drawings a sheet metal strip 25 provides the stock material from which the chain links are formed. The strip is approximately thirty-three to thirty-four thousandths of an inch in thickness and about one and one quarter inches in width. In the particular method of link formation shown in the drawings, this strip is passed step by step through a reciprocating type of punch press and each link section of the strip is passed through a series of operations culminating in the final separation from the strip of the link blank partly formed to its final shape. The first operation on the strip is the punching of the guide and centering hole 26 which punching is repeated at a distance of one inch between centers after which the strip is moved and has the four link pin holes 27 punched for two links, the centers of the holes being spaced one half inch and each hole being about eleven hundredths of an inch in diameter. A second group of four holes 27 is then punched so each unit section of the strip will form four links.

The holes 27 are then flanged upward and enlarged to form the openings 28 within the upwardly curved flanges 29, the inner diameter of the opening being stretched to substantially seventeen hundredths of an inch. In the following operation the metal contained in the flange 29 is used to provide bosses in the form of annular flanges on each side of the strip 25 around the pin bearing openings 30 which are about nineteen hundredths of an inch in diameter. The upper boss or flange 31 rises approximately twenty-two thousandths above the strip surfaces and the lower boss or cuff 32 has its lower surface about four thousandths of an inch below the lower surface of the strip 25. This completes the formation of the bearing surfaces of the links which are to fit and rotate on the chain pins.

The links 33 are then stamped out in outline 34 as shown in Fig. 5, each link being pressed half way through the strip 25 and then pressed back into place again and then fed to punching-out pins which remove the links entirely from the strip.

Figs. 1, 3, 5 and 7 are plan view sections of a continuous strip removed from the punching dies, the Fig. 1 end of the strip being that just entering the dies and the Fig. 7 end of the strip being that leaving the dies after the removal of the links. The particular mechanism used moves the strip in one inch steps, the successive dies being spaced apart for mechanical reasons so that there is an idle period for each section of the strip between each operation and the next, active operations being indicated on Figs. 1, 3, 5 and 7 as the 1st, 2nd, 3rd, 4th, 5th, 6th and 7th operations.

The entire set of punching, forming and coining dies operate together during each stroke, the blank strip being fed in at one end and out at the other end with the links removed.

In Figs. 9 to 11ª the operations on the strip are shown on enlarged scale. In Fig. 9 the strip is shown between the upper holding die 36, and lower holding die 37 with the tapered mandrel 38 entering the punched hole 27. Upward movement of this mandrel to the position shown in Fig. 9ª flanges the edges of the hole upward as shown at 29 stretching and thinning the material while bending it and enlarging the hole. The next die operation is shown in Figs. 10, 10ª and 10ᵇ wherein the strip 25 held between dies 39 and 40 has the annular flange 29 stretched by downward movement of the mandrel 41 as shown in Fig. 10ª after which the annular shoulder 42 of the upper punch or die compresses the metal of the flange, as shown in Fig. 10ᵇ, to form the upper boss 31, the lower boss 32 in the annular space bounded by the should 42 above and the ring 43 below and the dies 39 and 40 on the outside and the cylindrical portion of the mandrel 41 on the inside. This space for the compression of the flanged metal is just a trifle larger than the total volume of metal to be compressed so that there is left a small corner space 45 not quite filled with the metal and when the stock runs thick this corner space will be very small or may disappear altogether, but when the stock runs thin this corner space will increase in size and so take care of the variation in the amount of metal available to form these bosses. This operation is carried on under a very high pressure causing an actual flowing of the metal so that it is swaged or coined into the exact form of the dies in very accurate manner, all the links having these surfaces formed identically the same.

After the pin bearing surfaces and bosses have thus been coined into shape the whole link in outline 34 is punched half way out of the strip. The strip is held between upper and lower dies and the upper punch 47 having the outline of the link stamps the link downward displacing it approximately half way through the strip 25 against the yielding mandrel die 48 below (see Fig. 11ª). The upper punch 47 then moves upward slightly and the mandrel 48 presses the link blank back into place in the strip 25 with its upper and lower surfaces substantially continuous with the upper and lower surfaces of the strip. This avoids warping or deformation of the strip during the punching of the other links and the strip is then fed to the next dies which punch out the links 33 free from the strip.

The link as it leaves the strip of sheet material is thus blanked out in outline 34 and provided with the bosses forming the bearing surface 30 for the chain pin. The teeth of the link where they engage the teeth of the gear are to be turned or flanged over to give a large bearing surface and to provide this engaging face for the teeth the link blank is formed with the extension 49 of the tooth body. The next operation on the link is the turning up of this extension 49 into the gear engaging flange 50 as illustrated in Figs. 12ª to 12ᵍ and as shown in completed form in Figs. 12 to 16. In Fig. 12ª one end of the link 33 is shown engaged between the lower anvil 51 and the upper punch or holding die 52 with the outer flanging die 53 having a relative upward movement engaging the extension 49 of the link by the rounded surface 54 of the die to turn this extension upward as shown in Fig. 12ᵇ. This flanging operation is immediately succeeded by a coining or swaging operation with the link still held between the holding dies 51 and 52. These coining or swaging dies comprise an outer die 55 moving relatively downward to enclose the flanged extensions 49 and an upper die 56 also moving downward and fitting accurately on the punch die 52 and having an inwardly projecting overhanging shoulder 57 engaging and pressing downward on the flange 49 so as to flatten said flange into the form shown in Fig. 12ᵈ at 50, the pressure being so great as to cause the metal to flow into the desired shape. This operation is similarly and simultaneously carried out on each extension 49 of the link teeth, the upper punch 52 fitting the upper surface of the link but recessed to leave a space for the flanges 49, 50 while the lower anvil 51 fits accurately the shape of the lower surface of the link.

In thus forming the gear engaging flanges 50 it is important to avoid any weakening of the metal such as might cause these flanges to bend or chip off in service. To make the bond between the flange 50 and the body of the link 33 as strong as possible the link as blanked from the strip 25 has a fillet 60 left in the corner between the projection 49 and the body of the link 33 and in the turning up of the flange care is taken to permit the metal to bend and flow as freely as possible to naturally accommodate itself to the new shape. The die 53 for instance simply bends up the extension 49 into flange form by a simple bending operation and in coining this flanged extension into the final gear engaging flange 50 the filleted end of the flange is left entirely free of restraint so that the metal fibres will form into the most natural shapes without sharp corners or cracks or weakened crevices. This formation of the gear engaging flange 50 is further illustrated in Figs. 12$^e$, 12$^f$ and 12$^g$. Fig. 12$^e$ is a section on line e—e of Fig. 12$^c$ showing the inner anvil 52 with its surface 58 forming the inner face of the space for the final flange 50. The outer die 55 has its faces 59 and 61 forming the side and end faces of the flange 50 and it will be noted that the opposite end of the space between the dies instead of being carried across as an angular face is carried free of the inner end of the flange along a curved surface 62 leaving a free space 63 within which the metal is not directly subjected to die pressure. Here, therefore, the metal will be free to twist and warp and stretch along natural lines and the characteristic shape assumed by the metal is shown in Figs. 12, 12$^f$, 13, 14, 15 and particularly Fig. 16 at 60'. This metal at 60' of the completed link forms a warped and twisted fillet of the fibres of the metal extending in twisted form from the body of the link 33 to the flange 50, a natural depression 64 being left at the base of the outer edge between the link and the flange where the metal fibres twist around from the body portion into the flange 50. This natural formation of the metal at this point gives a strong and durable bond between the flange and the body of the link without any point of weakness such as would be left if a sharp corner were die shaped at this inner edge of the flange.

The flanges 50 as finally coined are slightly thicker than the thickness of the sheet metal stock itself for instance with sheet metal stock of thirty-three thousandths thickness the thickness of the flange 50 may be approximately thirty-seven thousandths. This coining operation gives a perfectly flat gear engaging face 65 to the flange 50 of maximum area and at the same time the metal between the flange 50 and the body of the link 33 is thickened when considered along the diagonal line x—x of Fig. 12$^g$. These gear engaging flanges are thus thickened and provided with a perfectly true and flat gear engaging surface of maximum extent while the corner between the flange and the body of the link is increased in thickness and the bond between the flange and the link body is further strengthened by the natural bending of the metal fibres in the flanging operation as shown in Fig. 12$^b$, and in the coining operation as illustrated in Figs. 12$^e$ to 12$^f$ and 12$^g$. This natural bending of the metal fibres is also observable in the end view of the flange 50 as seen for instance in Fig. 14 where the bending and the subsequent coining causes the fibres to curve around as indicated at 66 in a manner leaving a slight depression 67 at the edge portion. The metal fibres are thus bent and turned into the desired form without disrupting or weakening them at any point but on the contrary with the resultant building up of the strength of the structure.

This formation of the chain link of sheet metal permits the shape and strength of the link to be made as desired so that the link will give a perfectly smooth action in the chain operation and will be of uniform strength and even in its wearing qualities. The bosses 31, 32 give an enlarged bearing surface on the chain pin and accurately space the links with relation to each other and also serve to locate the inter-engaging portions of the links at definite small areas immediately around the pin where relative movement between the links is a minimum, thus avoiding the frictional losses resulting from extended irregular contact between flat link surfaces. These bosses also accurately locate the link bearings with relation to each other irrespective of any incidental irregularity in the shape of the link stock. This stock is usually handled in rolls and when unrolled is not perfectly flat but tends to have a variable curvature which is practically impossible to remove. The resulting link would therefore have a bend between its ends which would cause the links particularly in assembled position to vary in relation to each other in such a way as to interfere with the accuracy of the chain in its engagement with the gears. In some chain for instance it is necessary to carefully assemble the links to provide against this very irregularity, the links being picked and assembled in such manner as to have the bend of one link counteract with that of another as far as possible. This hand picking and assembly of the links is a very expensive item in the cost of manufacture and is entirely avoided by the bosses 31, 32 of the link of this invention which give perfectly accurately formed bearing surfaces for the links irrespective of any irregularity of the stock material met within practice. The result is that the chain of this invention may be automatically assembled without any hand picking or matching of parts.

The collars or bosses 31, 32 being integral with the link also increase its strength. The only material removed for the bearing holes is the small amount of metal punched out to form the small pin holes 27 and the subsequent enlargement of these holes leaves the full amount of material concentrated as flanges forming both strengthening means and extended bearing surfaces. The concentration of the material adjacent the pin also permits the remainder of the link to be formed as desired to cooperate with any form of gear tooth without seriously reducing the strength of the link. For instance the dimensions of the link in the section O—Y, O—Z indicated in Fig. 12 may be relatively small bringing the outermost portions of the link surfaces at these sections close to the center of the pin. Enough material will be left in the bosses 31, 32 and in the flange 50 to give requisite strength to the link at the pin engaging portions, while the link body itself may be made of any desired dimensions equalling in strength the strength of the pin engaging parts. The chain shown in the drawings when subjected to a breaking test for instance not only showed a greater strength than prior chains of greater weight but also at final breaking located the ruptures in the body of the link and not at the pin engaging parts.

The larger bosses 31 are raised above the face of the stock a distance somewhat greater than one half the height of the flanges 50 above the surface of the stock on the same side of the link so that when the links are assembled as shown in Fig. 17 these collars 31 space the links apart a distance slightly greater than the height of the flange and the flanges will be received between the links without engaging the side surface of the adjacent link. The engagement between the links is thus limited entirely to engagement of collars 31 with each other and the engagement of collars 32 with each other, successive adjacent links being so assembled that their flanges at their engaging ends are in opposite directions. Consequently each link at its end on its flange side engages the flanged side of the next adjacent link and similarly on its unflanged side engages the unflanged side of the next adjacent link.

Any desired number of links may be assembled to form the width of the chain and at the center there will usually be provided guide links 70 having inner straight edges without the flanges 50 and without any central recess. These guide plates will be formed with bosses 30 and 31 similar to those on the links 33, and these guide plates may be at the outside instead of at the center of the chain.

The chain pins 71 are of a size just smoothly fitting within the bearing surfaces 30 of the links and are reduced at their ends to form a shoulder 72 against which is seated a retaining washer 73 held in place by the riveting over of the reduced end portion 74 of the pin. These pins are specially made by treating the rod, shown in Fig. 19, to add carbon to its outer surface material and then cutting away the end of each pin, as shown in Fig. 20, to leave the reduced end portion 74 of relatively soft material, the pins being then heated and quenched to harden the relatively highly carbonized outer portions without affecting the soft end portions 74 which are easily riveted, as shown in Fig. 21, without affecting the central high carbon hardened portion of the pin in any way. The outer surface of the rod stock shown in Fig. 19 is carbonized by subjecting it to heat, about 1700° F. while submerging it in carbonation material to permit the carbon to be absorbed by the surface skin of the rod so that when said rod is subsequently again heated and quenched it will be greatly hardened at this high carbon surface. This gives a very hard and durable bearing surface to the pins greatly increasing the life of the chain.

The chain of this invention is thus formed of links of stamped or die shaped sheet metal directly producible from the stock material without any hand operation. The links and pins are also adapted for automatic assembly with the links directly engaging the pins and inter-engaging with each other by simple limited contact between the collars 31—31 and 32—32. The spacing of the links is such as to permit the broadened faces to clear the flat surface of the adjacent link and the chain thus has a wide range of flexibility while all of its surfaces accurately fit and work together with a minimum of friction and noise. Where desired a tooth may be provided on the back of the link to engage the teeth of a back gear. In supplying material for the bosses 31 and 32 it may be desirable not only to flange the metal as shown but also to cup it to draw in material from the surrounding portions of the slip. The angle between the working faces of the teeth of each link is about 60° and at its center between the teeth the link is cut away a distance of three hundredths of an inch above the cord connecting the centers of the bearings. Each side of this central space is then carried for some distance on an arc of about seventeen hudredths of an inch radius and then tangentially at about 30° to the center line and then at the point A there is an abrupt corner from which the tooth edge on each side extends outward at an angle of 60° to the center line and tangent to a radius of about eighteen hundredths of an inch around the center of the bearing. The body of the link is substantially circularly shaped at each end along a radius of about twenty-eight hundredths of an inch around a center taken on the cord line on the centers of the bearings at about one hundred and forty-four thousandths of an inch from the intersection of the cord line with the transverse center line of the link. A chain link so proportioned and combined with other links will cooperate in a thoroughly efficient manner with the teeth of gears now in general use. Where it is desired or permissible to use specially formed gears the dimensions of the relative proportions of the link parts may be correspondingly varied for instance to increase the angle between the working faces of the link teeth.
With the link of this invention relatively thin stock material may be used, less than one-tenth of the distance between the pin centers, for instance. The thickness of the stock material and the various dimensions of the pin bearings and bosses and tooth engaging flanges may be varied within wide limits without departing from the invention which is not confined to the specific embodiment shown and described but is intended to cover any modifications falling within the scope of the appended claims.

We claim:

1. In a chain the combination with a series of pins, of toothed links formed of stamped sheet metal pivoted directly on said pins without other connection with each other, said links having completely cylindrical bearing bosses on opposite sides engaging said pins and contacting at their ends with the next adjacent link.

2. In a chain the combination with a series of pins, of toothed links formed of stamped sheet metal pivoted directly on said pins without other connection with each other, each link having unequal bearing bosses on each bearing surface engaging said pins, and the smaller bosses of one link engaging the smaller bosses of the next adjacent links to space said links apart.
3. In a chain the combination with a series of pins, of toothed links formed of stamped sheet metal pivoted directly on said pins, each link having unequal bearing bosses on each bearing surface engaging said pins and the larger bosses of one link engaging the larger bosses of the next adjacent links to space said links apart.

4. In a chain the combination with a series of pins, of toothed links formed of stamped sheet metal pivoted directly on said pins, each link having unequal bearing bosses on each bearing surface engaging said pins and the smaller bosses of one link engaging the smaller bosses of the next adjacent links and the larger bosses of one link engaging the larger bosses of the next adjacent links to space said links apart.

5. In a chain the combination with a series of pins, of toothed links formed of stamped sheet metal pivoted directly on said pins, cylindrical bosses at the bearing surfaces spacing adjacent links so that said links are without other connection with each other, the links having the gear contacting surfaces of their teeth broadened to be wider than the thickness of the link stock.

6. In a chain the combination with a series of pins, of toothed links formed of stamped sheet metal pivoted directly on said pins, cylindrical bosses at the bearing surfaces spacing adjacent links so that said links are without other connection with each other, each link having the gear contacting faces of its teeth turned over on the same side to be wider than the thickness of the link stock.

7. In a chain the combination with a series of pins, of toothed links formed of stamped sheet metal pivoted directly on said pins, cylindrical bosses at the bearing surfaces spacing adjacent links so that said links are without other connection with each other, the link bearing bosses at its surfaces engaging said pins having the gear contacting surfaces of their teeth broadened to be wider than the thickness of the link stock.

8. In a chain the combination with a series of pins, of toothed links formed of stamped sheet metal pivoted directly on said pins, each link having a completely cylindrical boss at the bearing surface contacting with the pin and having the gear contacting surfaces of its teeth broadened to be wider than the thickness of the link stock, the ends of the bosses of each link contacting with the ends of the bosses of the next adjacent link.

9. In a chain the combination with a series of pins, of toothed links formed of stamped sheet metal pivoted directly on said pins, each link having the gear-contacting surfaces of its teeth broadened on one side of the link to be wider than the thickness of the link stock, and with completely cylindrical bosses at the bearing surface contacting with the pin on the same side of the link as said broadened gear-contacting surfaces, the ends of the bosses of each link contacting with the ends of the bosses of adjacent links.
10. In a chain the combination with a series of pins, of toothed links formed of stamped sheet metal pivoted directly on said pins, each link having unequal completely cylindrical bearing bosses at its surfaces engaging said pins and the smaller bosses of one link engaging the smaller boss of the next adjacent link.

11. In a chain the combination with a series of pins, of toothed links formed of stamped sheet metal pivoted directly on said pins, each link having unequal completely cylindrical bearing bosses at its surfaces engaging said pins and the larger bosses of one link engaging the larger bosses of the adjacent link.

12. In a chain the combination with a series of pins of toothed links formed of stamped sheet metal pivoted directly on said pins, each link having unequal completely cylindrical bearing bosses at its surfaces engaging said pins and the smaller bosses of one link engaging the smaller bosses of the next adjacent links and the larger bosses of one link engaging the larger bosses of the next adjacent link.

13. A toothed chain link formed of stamped sheet metal and comprising a pin bearing having a completely cylindrical boss on each side integral with the body of the link, the end of said bosses being smoothly finished to engage and space an adjacent link, one boss being longer than the other.

14. A toothed chain link formed of stamped sheet metal and comprising a pair of pin bearings having completely cylindrical bosses on each side integral with the body of the link, the ends of said bosses being smoothly finished to engage and space adjacent links, the bosses on one side being longer than those on the other side.

15. A toothed chain link formed of stamped sheet metal and comprising a tooth portion having its gear contacting surface broadened on one side of the link by flanging over of the metal at an angle to the body of the link and a connecting neck of material forming a twisted web fillet between the inner end of the flange and the body of the link.

16. A toothed chain link formed of stamped sheet metal and comprising a tooth portion having its gear contacting surface broadened on one side of the link by flanging over of the metal with a web fillet between the inner end of the flange and the body of the link, and a depression formed at the base of said flange adjacent said fillet.

17. A toothed chain link formed of stamped sheet metal and comprising a tooth portion having its gear contacting surface broadened on one side of the link by flanging over and die shaping of the metal, the thickness of said flange being greater than the thickness of the link body.

18. A chain comprising links connected by a series of pins each pin being formed of a single integral piece and having a hardened bearing portion for engagement with the links and a reduced end portion of relatively soft metal carrying a retaining washer and riveted over to retain the washer and links in assembled position.

HEBRON B. LAYMAN.
HJALMER S. THURNER.